Dec. 9, 1952

T. S. ONARHEIM 2,621,060

ANTISKID DEVICE FOR VEHICLES

Filed Feb. 6, 1951

INVENTOR
TRYGVE S. ONARHEIM
BY
ATTORNEY

Patented Dec. 9, 1952

2,621,060

UNITED STATES PATENT OFFICE 2,621,060

ANTISKID DEVICE FOR VEHICLES

Trygve Sigūrd Onarheim, Etna, Calif.

Application February 6, 1951, Serial No. 209,548

2 Claims. (Cl. 280—150)

This invention relates to devices for reducing skidding in motor vehicles, and is particularly directed to a device which may be readily connected to a vehicle for substantially eliminating sidewise skidding of the vehicle normally encountered in driving on icy roads.

An object of this invention is to provide a device which may be easily installed on a vehicle, and which, when placed in operative position, will impart a load directly on the rear wheels of the vehicle.

Another object of the invention is to provide a device of the character described which may be readily installed on or removed from the vehicle, depending on the nature and condition of the roads.

A further object of my invention is to provide an anti-skid device of the type referred to in which all of the parts thereof may be manufactured and assembled at a low cost, and which is so compact in construction that it will not interfere with the normal operation of the vehicle.

A still further object of the invention is to provide a device of the above character which will insure proper weight distribution on the driving wheels of the vehicle, but which will not, in any way, interfere with or detract from the riding characteristics and comfort of the vehicle.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to the drawing.

Figure 1:
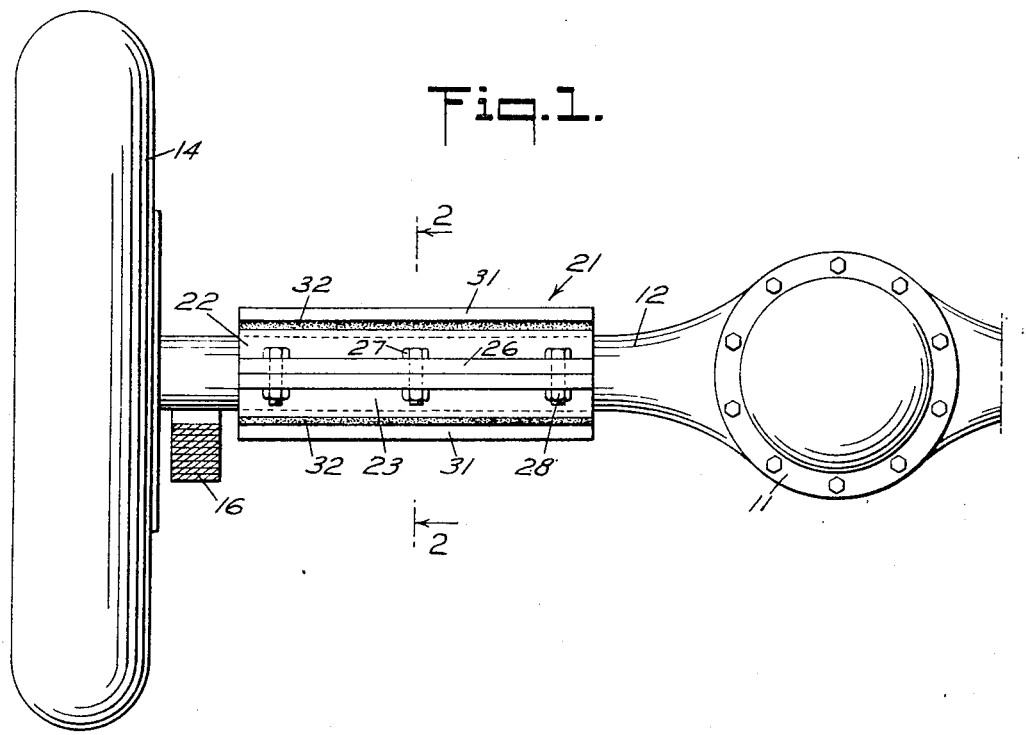
Figure 1 is a first elevational view of a portion of an automobile or similar vehicle showing the weight of my invention attached thereto.

In the past, numerous devices, ideas, and mechanisms have been presented to the purchasing public, intended to serve as skidding preventers, but none of these have received any widespread acceptance for a variety of reasons. Among such reasons is the fact that, in general such devices are so complicated and expensive as to preclude the average motorist from obtaining the same. Also, in a number of the devices, where a weight arrangement is used, the gravitational force of the weights is imposed in whole or in part on the springs of the vehicle, thereby greatly reducing the riding qualities of the vehicle, and also requiring tremendous weights in order to impart a direct load on the wheels of the vehicle.

In the present invention, I have overcome the foregoing disadvantages and have provided an antiskid weight which will greatly reduce sideskidding caused by slippery roads or the like in a far better and more economical manner. In general, the weights of the present invention are arranged to impart a direct load on the wheels of the vehicle, as it has been ascertained that by increasing the vertical load imposed on the road surface by the wheels, there is a far less tendency of the wheels to skid transversely when the vehicle is moving in its normal direction.

The device is shown in the drawing in operative position on a conventional vehicle, and it will be noted that I have merely illustrated sufficient parts of the latter to form a background for an understanding of the invention. Referring to the drawing, a portion of the rear chassis of a vehicle is disclosed and includes the differential carrier or housing 11, the rear axle housing 12 carrying the axle 13, and a rear wheel 14, it being understood that a similar axle housing and wheel are disposed in a like manner on the other side of the carrier 11, but not shown for purpose of conserving space on the drawing.

Adjacent wheel 14 is shown a leaf spring 16, and as is well known to those skilled in the art, such springs may be of various types depending on the make of the vehicle, but in general, are secured at one or both ends to the underside of the vehicle body and also secured to the axle housing 12. In this manner, the springs, in conjunction with the shock absorbers, not shown, resiliently and flexibly support the vehicle body and its occupants relative to the axle housing and the wheel and greatly increase the riding characteristics of the vehicle. It has been suggested by certain safety experts that when driving over snow or ice-covered roads one should load the rear end of the vehicle with weights to assist in the elimination of side skidding. However, it is believed apparent that such an arrangement would greatly reduce the functions and purposes of the springs. In contrast to such an arrangement, I have arranged to provide weights directly on the axle housing which obviously does not interfere with the spring action which is essential for comfortable driving, and which does not require any cluttering up of the trunk or body of the vehicle with weights.

Figure 2:
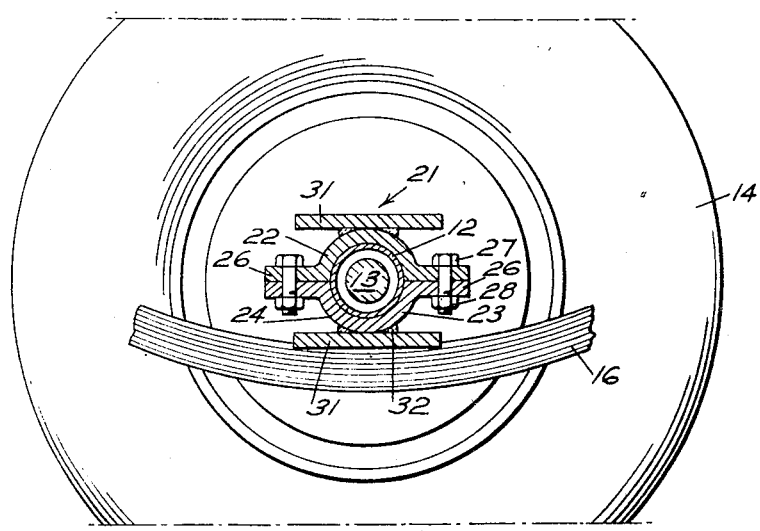
Figure 2 is a cross-sectional view taken in the plane indicated by the line 2—2 of Figure 1.

While the weights may assume a variety of shapes and designs, the one disclosed in the drawing is of extremely simple and economical construction, and as will be presently described, may be selectively installed on or removed from the vehicle with a minimum of effort. The device, generally indicated by the numeral 21 includes a pair of substantially identical symmetrical elements 22 and 23, the latter being generally disposed immediately under the axle housing 12 and the former immediately over the housing. Each of these elements is preferably constructed of iron, steel or comparable heavy weight material and includes an arcuate portion 24 having an inner radius of curvature substantially corresponding to the outer periphery of the housing 12. The portion 24 extends longitudinally for any desired distance and is provided with transverse flanges 26 each having a plurality of apertures through which bolts 27 may extend. As is best seen in Figure 2, when the elements are placed in operative position, they are locked in position by dropping the bolts through the respective aligned apertures of each element and secured together by nuts 28 threadedly engaged with the bolts. With this arrangement, in installing the device, the upper element 22 may be supported on the housing 12 and it is only necessary to bring the lower element 23 in registration therewith and merely support the latter until the bolts and nuts may be engaged.

As will be understood, the length of the devices are necessarily limited in length to the free distance between the differential carrier and the wheel, and therefore, in order to provide additional weight for the device, metal bars 31 may be secured to portions 24 as by welding indicated at 32.

From the foregoing, it will be seen that I have provided an anti-skidding device which provides added weight where the same is needed without affecting the vehicle springs, which is economical to manufacture, and which may be easily removed when not required. By way of illustration only, I have found that by having each device weigh approximately one hundred pounds, and mounting one of such devices adjacent each of the rear wheels, side-skidding in an average automobile may be substantially eliminated. Obviously, this figure may be varied within wide limits depending on the particular size and type of vehicle.

I claim:

1. An anti-skid device for vehicles having a substantially cylindrical fixed rear axle housing encompassing a rotatable axle, comprising a first metallic weight member of a length substantially equal to the axial length of said housing, said member having a semi-cylindrical groove therein extending axially for the length of the member, said groove being of a size permitting said member to be placed in intimate engagement with approximately one-half the periphery of said housing, a second metallic weight member substantially identical to said first member and having a groove arranged to be placed in intimate engagement with the other one-half of said housing periphery, radially extending flanges on each of said members extending transversely of the members and said housing arranged to be positioned in contiguous relationship, and means for releasably securing said flanges together so as to substantially enclose the greater portion of said housing.

2. Apparatus as set forth in claim 1, in which each of said members are provided with substantially rectangular heavy plates secured to opposed peripheral surfaces of the respective members and extending for substantially the entire axial length of the latter, said plates extending transversely of said members less than the transverse extent of said flanges so as to permit ready accessibility to said securing means.

TRYGVE SIGŪRD ONARHEIM.

REFERENCES CITED

The following references are of record in the file of this patent:

UNITED STATES PATENTS

| Number | Name | Date |
|---|---|---|
| 1,140,257 | Dreyfus | May 18, 1915 |
| 1,343,687 | Scott | June 15, 1920 |
| 1,687,296 | Johnson | Oct. 9, 1928 |
| 1,903,968 | Hosmer | Apr. 18, 1933 |
| 2,545,578 | Hanel | Mar. 20, 1951 |